United States Patent
Finch et al.

[19]

[11] Patent Number: 6,062,170
[45] Date of Patent: May 16, 2000

[54] METHOD AND APPARATUS FOR PLANKTON REDUCTION IN FISH FARMING

[75] Inventors: Richard John Finch, Campbell River; D'Arcy Davidson; Rolf Lueck, both of Victoria, all of Canada

[73] Assignee: Nutreco Canada Inc., Vancouver, Canada

[21] Appl. No.: 09/088,555

[22] Filed: Jun. 1, 1998

[51] Int. Cl.[7] .............................. A01K 61/00; B63B 59/00
[52] U.S. Cl. ............................ 119/215; 119/240; 114/222
[58] Field of Search ................................. 119/207, 208, 119/209, 215, 238, 239, 240; 114/222, 230, 256, 257, 266; 135/88.1, 90, 96, 123, 129, 161, 117, 120.2

[56] References Cited

U.S. PATENT DOCUMENTS

| | | | |
|---|---|---|---|
| 3,142,283 | 7/1964 | Fisher | 114/222 |
| 3,571,819 | 3/1971 | Puncochar | 114/222 |
| 3,709,195 | 1/1973 | Tabb | 119/207 |
| 4,026,233 | 5/1977 | Cox | 114/229 |
| 4,046,094 | 9/1977 | Preiser | 114/222 |
| 4,092,039 | 5/1978 | Lutkenhouse | 296/26 |
| 4,215,644 | 8/1980 | Jackson | 114/222 |
| 4,259,926 | 4/1981 | Marliave | 119/207 |
| 4,280,438 | 7/1981 | Jackson | 114/222 |
| 4,280,439 | 7/1981 | Jackson | 114/222 |
| 4,395,970 | 8/1983 | Kunkle et al. | 119/215 |
| 4,438,725 | 3/1984 | O'Sullivan et al. | 119/215 |
| 4,693,200 | 9/1987 | Noble | 114/47 |
| 4,747,369 | 5/1988 | Gotmalm | 119/207 |
| 4,766,846 | 8/1988 | Lavoie | 119/208 |
| 4,876,985 | 10/1989 | Marcum et al. | 119/239 |
| 4,913,428 | 4/1990 | Nauman | 273/29 BC |
| 4,982,697 | 1/1991 | Neff | 119/207 |
| 5,009,189 | 4/1991 | Neff | 119/207 |
| 5,152,242 | 10/1992 | Bradley | 114/222 |
| 5,279,244 | 1/1994 | Perez-Collazo | 114/222 |
| 5,465,676 | 11/1995 | Falcaro | 114/222 |
| 5,477,813 | 12/1995 | Lien | 119/223 |
| 5,617,813 | 4/1997 | Loverich et al. | 119/223 |
| 5,628,279 | 5/1997 | Bones, IV | 119/215 |
| 5,770,621 | 6/1998 | Braidwood et al. | 514/521 |

FOREIGN PATENT DOCUMENTS

| | | | |
|---|---|---|---|
| 467369 | 8/1950 | Canada | 119/230 |
| 003123117A1 | 12/1982 | Germany . | |
| 003932212A1 | 4/1991 | Germany . | |
| 40/5153884 | 6/1993 | Japan | 119/240 |
| 408312202 | 11/1996 | Japan . | |

*Primary Examiner*—Michael J. Carone
*Assistant Examiner*—Fredrick T. French, III
*Attorney, Agent, or Firm*—John Russell Uren

[57] ABSTRACT

Method and apparatus for reducing or eliminating the contamination by algae or phytoplankton in a fish farm (100). A series of tarpaulins (112) are suspended from buoyant members (103) which support the netting (102) of the farm (100). The tarpaulins (112) are connected at their lowermost ends (115) to a movable series of horizontal booms (122) that may take on air for positive buoyancy or which may displace the air with water for negative buoyancy. The booms (122) reciprocate on generally vertically oriented spars (113) which are maintained in position using anchors (104) and stays (111). As the booms (122) are raised or lowered, the tarpaulins (112) are similarly raised or lowered to allow or prevent algae from entering the farm (100). A water pipe (200) is maintained in position within each cage (101). Air is injected into the water pipe (200) from a compressor (214). The injected air initiates water flow upwardly within the water pipe (200). The outlet (210) of the water pipe (200) is maintained below the surface of the water within which the water pipe (200) is positioned and dispenses the air and water into the water below the water surface.

14 Claims, 3 Drawing Sheets

6,062,170

METHOD AND APPARATUS FOR PLANKTON REDUCTION IN FISH FARMING

INTRODUCTION

This invention relates to fish farming and, more specifically, to a method and apparatus used to reduce or eliminate the concentration of algae within the cages where fish are farmed.

BACKGROUND OF THE INVENTION

Fish farming is conducted throughout the world and with entire stocks or species of fish being extinguished or substantially reduced because of overfishing, environmental concerns or otherwise, fish farming has taken on increased importance.

Such farming is generally conducted within the natural ocean environment. The netting used to hold and raise the fish is located at areas offshore, preferably in coves and the like where the netting and the fish are somewhat sheltered from storms, which storms can be damaging to the farm enclosures. In such an environment, the farms are subject to general sea conditions including current and tidal flows.

At certain times of the year, algae or phytoplankton often appear within the waters where fish are being farmed. In the areas around the northwest coast of the United States and the west coast of Canada, the algae begin to appear in late spring or early summer. The presence of algae within the fish pens is not desirable and fish mortality will increase if the algae is allowed to persist and is not reduced or eliminated.

One technique for keeping algae from contacting the fish is to connect tarpaulins to the walkways supporting the netting of the pens or cages and allow the tarpaulin to extend downwardly on the outside of the netting thereby preventing the flow of algae into the fish pens where it can contaminate the water within the cages. Where current flows are not a problem, the technique is satisfactory although the oxygen levels within the fish pens can become depleted after time and must be replenished, generally with the use of water circulated from the lower portions of a water column to the upper portions and thence to the water within the cages. This circulation is generally created by air injection into a series of vertical pipes which creates upwards flow and displaces the water within the cages when the water is released from the pipes over the water surface.

However, current flows in the vicinity of the fish pens are frequently a problem when tarpaulins are used. This is so because the area of the tarpaulins is necessarily large in order to ensure the containment and diversion of algae and plankton. The current acts over the entire area of the tarpaulins and creates a significant force on the tarpaulin which tends to lift the tarpaulins from their vertical or hanging positions assumed in calm water. The tarpaulins then angle away from their vertical position about their upper attachment points. When the tarpaulins are lifted by the current, the algae can then enter the netting because a certain area of the tarpaulins is no longer effective to maintain the water integrity of the fish cages.

To deal with this problem, weights were attached to the bottom of the netting and the tarpaulins are connected top and bottom to the netting. Thus, there will be a greater tendency for the nets and the attached tarpaulins to maintain their position in the vertical position under the force of current flow. However, even with weights of significant mass, a rise in current flow will still deflect the nets and attached tarpaulins significantly so that the use of weights is only useful for relatively small current flows. In addition, the tarpaulins may only be attached when algae is present. Otherwise, current flows carrying fresh oxygen for the fish, will no longer be able to do so. When the presence of algae is expected, the tarpaulins are connected to the netting manually by a diver or divers and, when the algae is no longer a problem, the tarpaulins are removed. Such procedures are labor intensive, time consuming and difficult.

A further difficulty associated with the aforementioned water circulation problem when tarpaulins are used is that the vertical pipe in which the water flows has its outlet located above the surface of the water in the fish cages. The air injected bubbles that are dispersed into the atmosphere from the outlet of the water pipe do not disperse any energy to the water within which the fish are being raised. Thus, the mixing action of the water and air mixture coming from the outlet of the water pipe is generally limited to the immediate vicinity of the pipe outlet. Since it is desirable to have the mixing and replenishment of the water take place so as to provide more oxygen and better mixing over a greater volume of water, the present technique used for water and oxygen replenishment is undesirable.

SUMMARY OF THE INVENTION

According to one aspect of the invention, there is provided a method of raising and lowering a tarpaulin closing a contained area of a cage of a fish farm, said tarpaulin having a top operably connected to the upper portion of said cage, a bottom located at the lowermost area of said tarpaulin and a horizontal boom connected to said lowermost area of said tarpaulin, said method comprising raising said tarpaulin by exhausting water from said boom at said lowermost area and lowering said tarpaulin by adding water to said boom.

According to a further aspect of the invention, there is provided apparatus for raising and lowering a tarpaulin relative to netting adjacent said tarpaulin, said apparatus comprising a tarpaulin operably connected to the walkway of said cage, and a vertically reciprocal and movable tarpaulin lifter to raise and lower said tarpaulin.

According to yet a further aspect of the invention, there is provided apparatus to circulate water within a cage of a fish farm comprising a water pipe for circulating water within said cage, said water pipe having a water entry area and an outlet, an air injector for injecting air into said water pipe at a predetermined depth, said depth being higher than said water entry area, said water pipe having an outlet maintained at a level below the surface of the water within said cage.

According to still yet a further aspect of the invention, there is provided a method for circulating water within the cage of a fish farm, said method comprising positioning a water pipe having a lower portion and an outlet in a generally vertical configuration and moving water within said pipe from said lower portion of said outlet, injecting air into said pipe at a position located above said lower portion to initiate and maintain water flow within said pipe from said lower portion to said outlet, and maintaining said outlet of said water pipe at a position below the surface of said water in said cage and exhausting said water and air from said outlet of said water pipe below said surface.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
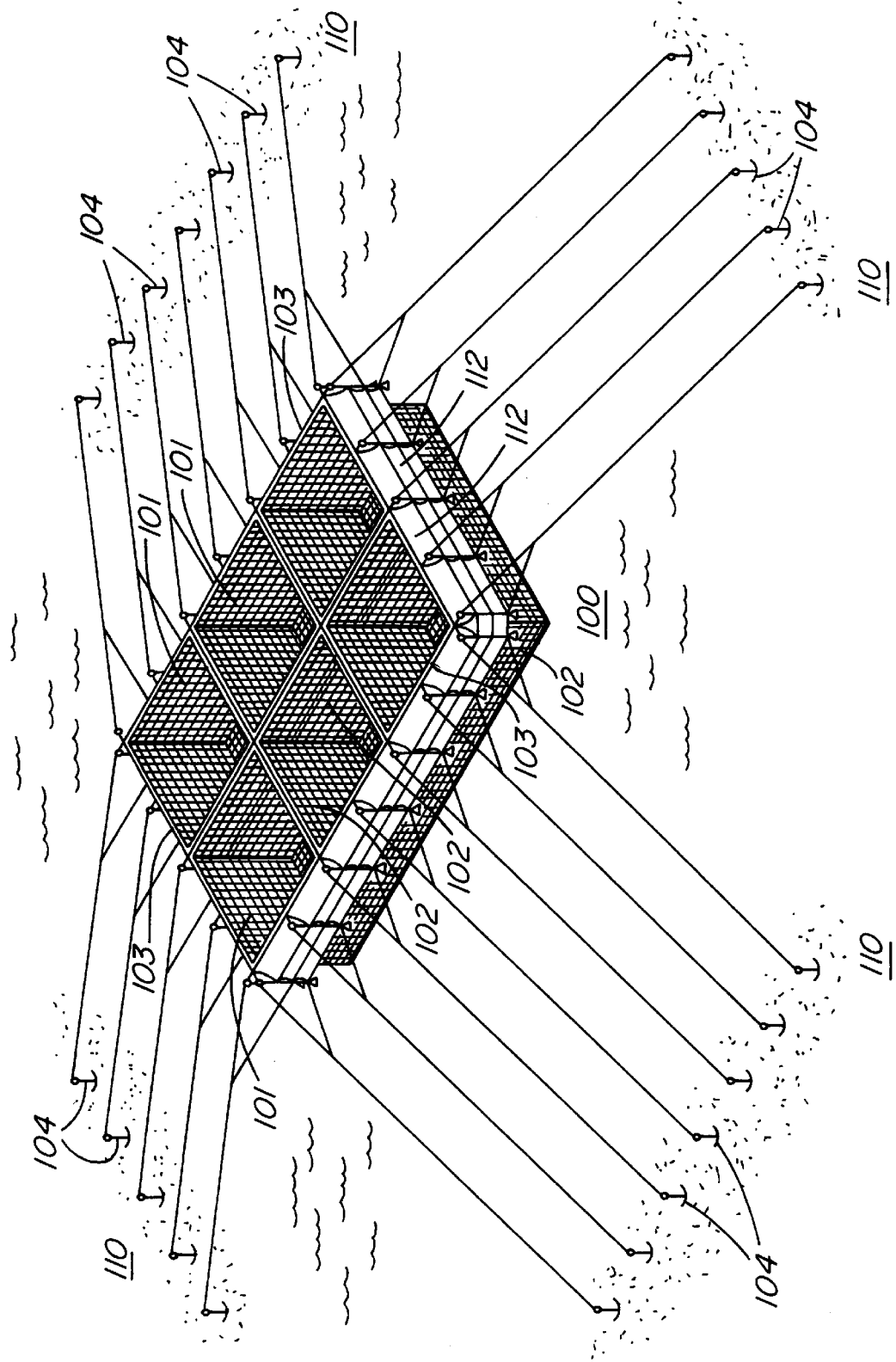
FIG. 1 is a diagrammatic isometric view of a fish farm in its operating location illustrating the installed tarpaulins according to a first aspect of the invention.

Referring now to the drawings, a fish farm of the known variety is generally illustrated at 100 in FIG. 1. It comprises a plurality of individual pens or cages 101, each of which is enclosed by nets 102 to prevent the escape of fish raised within each of the individual cages 101. The vertical nets 102 are connected at their upper ends to a walkway type support system 103 which walkways allow operators to walk above the individual pens 101 and attend to maintenance, feeding and the like. The walkway support system 103 also contains floats which provide the required positive buoyancy to the fish farm 100 to ensure that the tops of the vertical nets 102 are above the surface of the water in the cages 101 thereby to ensure the fish are constrained and cannot escape.

Figure 2:
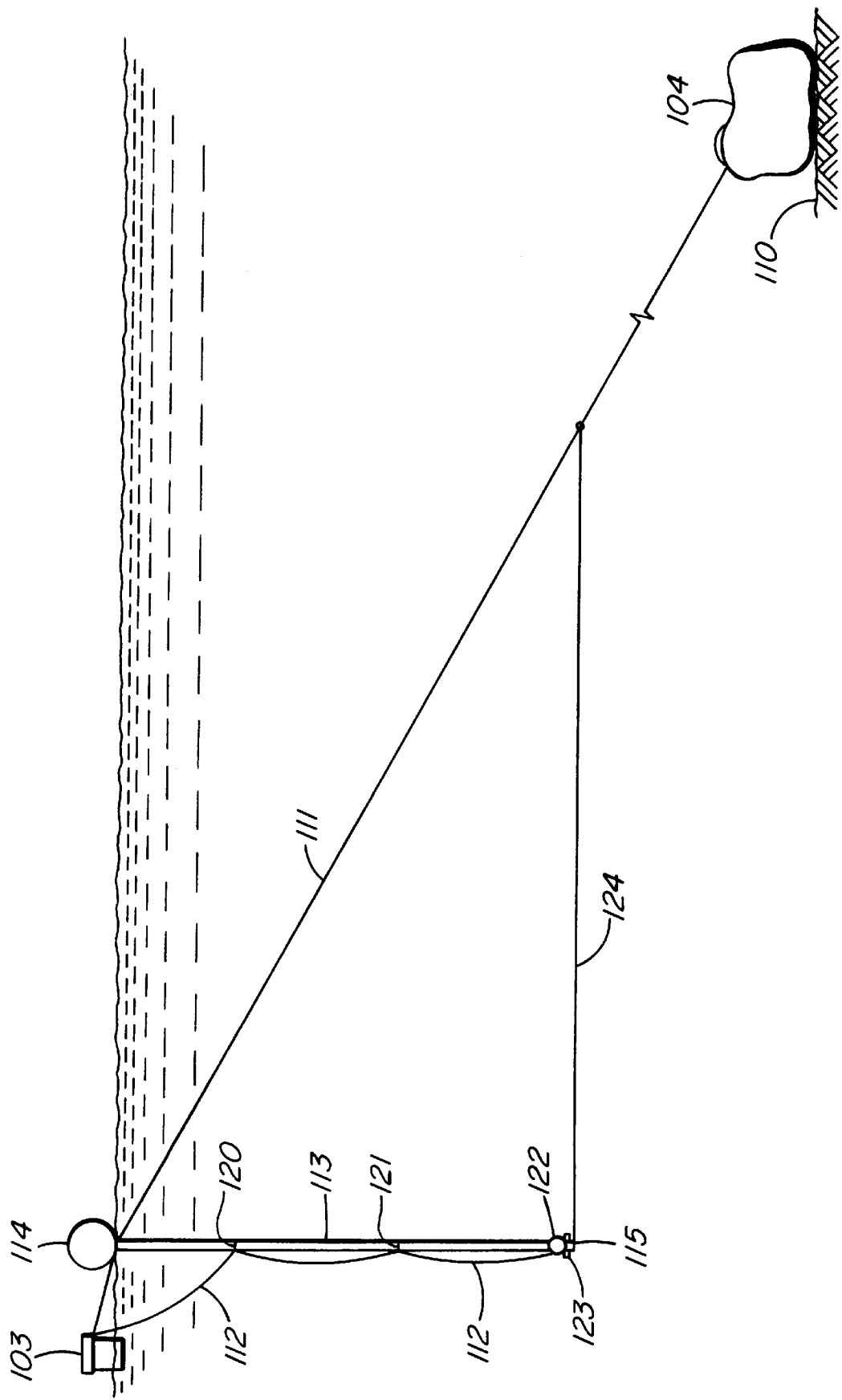
FIG. 2 is a diagrammatic side view of the installed tarpaulins particularly illustrating the spar connection and location and the anchor securing the tarpaulins and spar system.

The fish farm 100 is positioned in a location where natural nutrients are available and it is preferably sheltered from strong winds, storms and the like through a judicious choice of operating locations. The fish farm 100 is anchored in position in its operating location with a plurality of anchors 104 positioned on the floor 110 of the ocean or water location where the fish farm is located. Anchors 104 may take a variety of configurations but large rocks in the vicinity that are then transported to the desired location are conveniently used as seen in FIG. 2.

The fish farm 100 is secured to the anchors 104 by stays 111 extending from various locations on the farm 100 and the individual anchors 104. Stays 111 conveniently take the form of chains (not illustrated) connected directly to the farm 100 which chains are then connected to wire cable or ropes which extend to the anchors 104. Thus, the farm 100 is securely maintained in its desired operating location.

A plurality of tarpaulins 112 are connected to the walkways 103. The tarpaulins 112 extend downwardly from the walkways 103 and are connected to generally vertical spars 113 which are connected to independent flotation devices 114 located outwardly from the walkways 103 and the netting 102. Stays 111 extend to the flotation devices and, thence, to the walkways 103.

The tarpaulins 112 are secured to the spars 113 with slider rings 120, 121 (FIG. 2) which are movable on the spar 113. The bottom of the tarpaulin 112 is connected to a horizontal submersible boom 122 which is filled with water to allow it to sink and which allows for egress of the water in order to allow it to rise. The water is expelled from the boom 122 by attaching an air line (not shown) to the boom 122 which are line is connected to an air compressor 214 (FIG. 3) located at a working position on the walkways 103. A keeper 123 is provided at the bottom of each spar 113 in order to prevent the boom 122 from leaving spar 113.

A generally horizontal stay 124 is connected to the bottom of spar 113 and extends to stay 111. Stay 124 is intended to keep spar 113 in a position where it is generally vertical and fully downwards outside of the nets 102.

Figure 3:
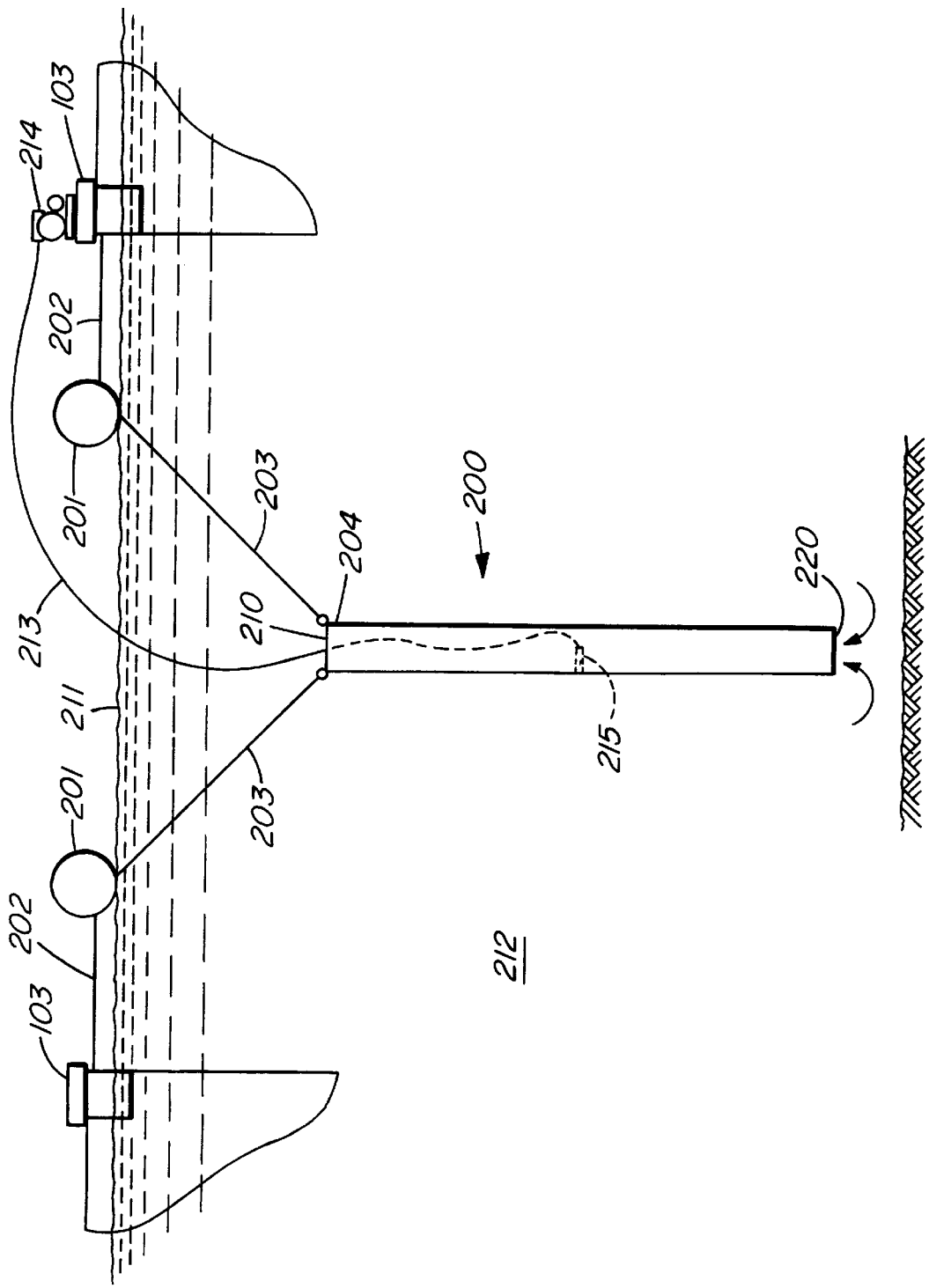
FIG. 3 is a diagrammatic side view of a water pipe and illustrating the support system for maintaining the outlet of the water pipe below the water surface.

Reference is now made to FIG. 3 wherein a water pipe is generally illustrated at 200. Water pipe 200 has a net negative buoyancy and is secured to the walkways 103 by a pair of buoys 201 and stays 202, 203. Stays 202 are conveniently ropes which are connected on one end to the walkways 103 and, at the other end to buoys 201. Additional stays 203 extend downwardly from the buoys 201 to the water pipe 200. Stays 203 are attached to the upper or outlet end 204 and maintain the outlet end 210 of the water pipe 200 below the water surface 211 in its generally vertical position.

An air line 213 is connected to air compressor 214. Air line 213 extends downwardly within the water pipe 200 and terminates with an air outlet 215 at approximately the one-half way lengthwise position of water pipe 200. Air from the air compressor 214 is emitted from the outlet 215 as the operator may desire.

Water pipe 200 has an inlet 220 at its lowermost end. Water enters the water pipe 200 at the lowermost end 220 and travels through the water pipe to be ejected from the outlet 210 and is circulated within the cages 101 as will be described.

OPERATION

In operation, it will initially be assumed that the farm 100 is uncontaminated by algae infestation and that the full current flow will be through the netting 102 unimpeded except for the netting itself. In this condition, the tarpaulins 112 will be in their raised position with the slider rings 120, 121 and booms 122 which are air filled being immediately below flotation device or buoys 114. Spar 113 will be maintained in its generally vertical position by stay 124 and the weight of spar 113.

It will next be assumed that there is an algae infestation anticipated. If so, the operator will fill the booms 122 with water by releasing the air previously injected into the booms 122 by an air line (not shown) connected to air compressor 214 and allowing water to enter the booms 122. Thus, the booms 122 will slowly sink within the water 212 in which the booms 122 are located. While the booms 122 sink, the tarpaulins 112 connected to the booms 122 will also move downwardly in association therewith while the slide rings 120, 121 likewise move downwardly.

Booms 122 will be restrained at their lowermost points of travel on spars 113 by keeper 123. In this condition, the tarpaulins 112 are fully extended and deployed to prevent the ingress of algae to the cages 101.

In the deployed condition, the force created by the current acting on the tarpaulins 112 is transferred from the tarpaulins 112 to the slider rings 120, 121 and thence to the booms 122. This force is transferred to spar 113, thence to stays 124, 111 and ultimately to anchors 104. While it is anticipated that the spars 113 will be maintained in the vertical and generally extended position shown in FIG. 2 under most if not all current conditions, it is contemplated that the spar 113 may rise under extreme current conditions. This may be advantageous to prevent damage to the tarpaulins 112 or supporting system 103. However, it may be that spar 113 will need to be tethered independently at its lowermost position to maintain the integrity of the current blocking action in order to prevent algae from reaching the fish pens 101.

When the tarpaulins 112 are in their deployed positions, the operation of the water pipe 200 will be commenced thereby to provide fresh oxygen laden water to the cages 101 and also to displace the stagnant water created by the deployment of the tarpaulins 112 and reduce or eliminate any algae infestation that may have found its way into the pens 101 despite the operation of tarpaulins 112.

Water pipe 200 is in the position illustrated in FIG. 3, with its outlet 210 being located below the surface 211 of the water 212. The operation of the air compressor 214 will be initiated and air will be injected into the water pipe 200 from air outlet 215. The air will rise within the water pipe 200. With air in the water within the water pipe 200 above the air injection position 215, there will be a lower density water in the water pipe 200 above the air outlet 214 than below it and, accordingly, the higher density water in the lower area of the water pipe 200 will flow upwardly to displace the lower density water. The air and water will be released from water pipe 200 from the outlet 210 at a location below the surface 211 of water 212.

It has been found that providing the water outlet 210 below the surface 211 of water 212 is advantageous as compared to the normal condition of releasing the water and air from an outlet 210 above the surface 211 of the water 212. By releasing the water and air below the surface 211 of the water 212, there is a greater dispersing action than otherwise would be the case; that is, when dispersing the water and air from a position above the surface 211 of the water 212, the energy carried by the air bubbles from the air compressor 214 will simply be dispersed to atmosphere without transferring such energy to the surrounding water. By dispersing the air bubbles below the surface 211 of the water 212, the energy is transferred to the stagnant water thereby creating a greater mixing action which is more widely dispersed. Likewise, the water exiting the water pipe 200 will transfer its kinetic energy to the water above and surrounding the water pipe 200 and that energy too will result in a greater mixing effect throughout the pens 102.

Thereafter, when the algae effect has diminished, and there is no further need for the tarpaulins to block the flow of water in the upper reaches adjacent the fish farm 100, the air compressor 214 is used with the air line (not shown) to inject air into booms 122. The air will displace the water inside the boom 122. As the water is displaced, the buoyancy of the booms 122 will become positive and when a predetermined value of positive buoyancy is reached, the booms 122 and attached tarpaulins 122 will rise thereby allowing current to flow again through the netting 102 unimpeded by the tarpaulins 112.

Many changes will readily occur to those skilled in the art to which the invention relates. Since the algae are present only for certain distances downwardly from the surface, partial downwards deployment of the tarpaulins 112 is contemplated to block the algae flow in the upper reaches of the water but to allow full current flow in that area of the water that is uncontaminated.

Many further changes will readily occur to those skilled in the art to which the invention relates and the specific embodiments disclosed should be taken as illustrative of the invention only and not as limiting its scope as defined in accordance with the accompanying claims.

What is claimed is:

1. Method of raising and lowering a tarpaulin (112) closing a contained area of a cage of a fish farm (100), said tarpaulin (112) having a top operably connected to the upper portion of said cage (101), a bottom (115) located at the lowermost area of said tarpaulin (112) and a horizontal boom (122) connected to said lowermost area of said tarpaulin (112), said method comprising raising said tarpaulin (112) by exhausting water from said boom (122) at said lowermost area and lowering said tarpaulin (112) by adding water to said boom (122).

2. Method as in claim 1 and further comprising positioning a water pipe (200) having a lower portion (220) and an outlet (210) in a generally vertical configuration within said cage (101) and moving water within said pipe (200) from said lower portion (220) to said outlet (210), injecting air into said pipe (200) at a position located above said lower portion to initiate and maintain water flow within said pipe (200) from said lower portion to said outlet (210), and maintaining said outlet (210) of said water pipe (200) at a position below the surface (211) of said water in said cage (101) and exhausting said water and air from said outlet (210) of said water pipe (200) below said surface (211).

3. Method as in claim 1 and further comprising moving said boom (122) in an operatively connected relationship with a spar (113).

4. Method as in claim 3 and maintaining said spar (113) in a generally vertical orientation.

5. Method as in claim 4 and further maintaining the uppermost portion of said spar (113) adjacent the surface of said water.

6. Method as in claim 5 and further comprising restraining the boom (122) at the lowermost portion (115) of said spar (113) with a keeper (123).

7. Apparatus for raising and lowering a tarpaulin (112) relative to netting (102) adjacent said tarpaulin (112) and to a walkway (103) adjacent a cage (101), said apparatus comprising a tarpaulin (112) operably connected to said walkway (103) of said cage (101), a boom (122) connected to the lower portion of said tarpaulin (112), and a vertically reciprocal and movable tarpaulin lifter (122) to raise and lower said tarpaulin (112) relative to said netting (102) and said walkway (103).

8. Apparatus as in claim 7 and further comprising a water pipe (200) for circulating water within said cage (101), said water pipe (200) having a water entry area (220) and an outlet (210), an air injector (214) for injecting air into said water pipe (200) at a predetermined depth, said depth being higher than said water entry area (220), said water pipe (200) having an outlet (210) maintained at a level below the surface of the water within said cage (101).

9. Apparatus for raising and lowering a tarpaulin (112) as in claim 7 wherein said tarpaulin lifter (122) is a boom, said boom (122) allowing air entry to displace water within said boom (122) when said boom (122) is raised and said boom (122) allowing air to be displaced by water when said boom (122) is lowered.

10. Apparatus as in claim 9 wherein said boom (122) is operatively connected to a spar (113), said boom (122) being horizontal relative to said spar (113).

11. Apparatus as in claim 10 wherein said spar (113) has a top portion connected to a flotation device (114) and a lowermost portion (115) generally vertically below said top portion.

12. Apparatus as in claim 11 wherein said spar 113 is maintained in position with a stay (124).

13. Apparatus as in claim 12 wherein said tarpaulins (112) are slidably connected to said spar (113) to allow relative movement between said tarpaulins (112) and said spar (113).

14. Apparatus as in claim 13 and further comprising an air compressor (214) for said boom (122).

* * * * *